United States Patent

Ni et al.

[11] Patent Number: 5,557,961
[45] Date of Patent: Sep. 24, 1996

[54] HYDROFORMED STRUCTURAL MEMBER WITH VARIED WALL THICKNESS

[75] Inventors: Chi-Mou Ni, Troy; Charles J. Bruggemann, Rochester Hills; Tasnim Hassan, Flint; Wallace T. Hall, Fenton, all of Mich.

[73] Assignee: General Motors Corporation, Detroit, Mich.

[21] Appl. No.: 557,664

[22] Filed: Nov. 13, 1995

[51] Int. Cl.⁶ .................................................. B21D 39/20
[52] U.S. Cl. ............................................ 72/61; 29/421.1
[58] Field of Search ........................ 72/58, 61, 62; 29/421.1

[56] References Cited

U.S. PATENT DOCUMENTS

| | | | |
|---|---|---|---|
| 4,759,111 | 7/1988 | Cudini | 29/523 |
| 4,827,100 | 5/1989 | Frings et al. | 219/121.64 |
| 5,070,717 | 12/1991 | Boyd et al. | 72/55 |
| 5,170,557 | 12/1992 | Rigsby | 29/890.08 |
| 5,303,570 | 4/1994 | Kaiser | 72/62 |
| 5,333,775 | 8/1994 | Bruggemann et al. | 228/157 |
| 5,431,326 | 7/1995 | Ni et al. | 228/155 |

FOREIGN PATENT DOCUMENTS

| | | | |
|---|---|---|---|
| 78551 | 5/1983 | European Pat. Off. | 72/61 |
| 34515 | 2/1989 | Japan | 72/61 |
| 489548 | 10/1975 | U.S.S.R. | 72/58 |

OTHER PUBLICATIONS

Automotive Industries, "Hydro-Forming is Hot", Jun. 1991.

*Primary Examiner*—David Jones
*Attorney, Agent, or Firm*—Patrick M. Griffin

[57] ABSTRACT

A method for hydroforming a tubular structural member of generally polygonal, flat walled cross section in which the various walls in the final part do not have the same thickness. A cylindrical tubular blank is extruded in which the outer surface is round, but in which the inner surface is asymmetrical, providing several contiguous angular sectors or portions of varying width and thickness. Each individual angular portion is tailored as to thickness and width to correspond to a respective wall in the final part. The blank is oriented between in a die cavity so as to align each angular portion with a respective wall of the finished part, and hydroformed in conventional fashion.

2 Claims, 7 Drawing Sheets

HYDROFORMED STRUCTURAL MEMBER WITH VARIED WALL THICKNESS

This invention relates to the hydroforming of metal tubular structural members in general, and specifically to a method for forming such a member in which the wall thickness of a cross section varies around the circumference of the cross section.

BACKGROUND OF THE INVENTION

More and more vehicle structural members that used to be fabricated from separate welded parts, such as engine cradles, are now being designed as hydroformed tubular members in which all, or most, of the parts are integrated. In a typical hydroforming operation, a cylindrical metal tube of constant wall thickness is bent into the overall shape desired for the final part, then placed between a pair of dies. The dies provide a cavity around the tube which has an interior shape matching the exterior shape desired for the part. Then, the ends of the tube are sealed and it is internally pressurized to expand it into the shape of the dies' cavity. Despite some small percentage of stretch that may occur as the tube expands, the wall thickness in the final part still basically matches that of the original tube or blank, and is therefore substantially constant at all points.

In some circumstances, a part that is locally thickened or reinforced for extra strength is desired. U.S. Pat. No. 4,759,111 discloses a method for making such a part in which a short sleeve is pushed concentrically over the main tube before it is expanded. The main tube is forced out and into the sleeve, which is left firmly fixed in place as a reinforcement. Another method is disclosed in co-assigned U.S. Pat. No. 5,333,775, in which several tubes of differing thickness are butt welded together, and then hydroformed. In both designs, extra welding or attachment steps are needed, beyond the basic process of simply placing a one piece tube blank into the dies. Also, in both cases, at any given cross section, the wall thickness as one moves circumferentially around the cross section is basically constant. That is, if a particular cross section of the final part is basically rectangular with four walls, each of the four walls has the same thickness, even though the wall thickness of cross sections at other points along the length of the part may be different.

SUMMARY OF THE INVENTION

The invention provides a method for hydroforming a structural member in which the wall thickness of any cross section is invariant in the longitudinal sense, but in which, at any given cross section, the wall thickness varies circumferentially. The process requires no extra welding or sleeve attachment steps when the blank is prepared.

In the preferred embodiment disclosed, an engine cradle has a generally rectangular cross section with four walls, and, in a strength-to-weight optimized design, it is desired that the walls have different thickness, even though the thickness is constant along the length of each wall. To achieve this, a cylindrical tube blank is first extruded through a die that gives it a cross section with a circumferentially varying thickness, rather that a constant wall thickness. The thickness of the blank cross section is matched to the thickness desired in each wall of the final part. In other words, as wide an angular sector or portion of the blank cross section as will be needed to produce the wall or walls with a certain thickness in the final part is given substantially that desired thickness. In addition, the varying thickness portions around the circumference of the blank's cross section are blended into one another across sloped transition areas, so as not to create sharp discontinuities on the interior surface of the blank. The outer surface of the blank is a simple cylinder.

The blank is then pre-bent (if necessary) to shape and placed between a pair of conventional hydroforming dies. The blank is oriented so that its varying thickness portions are properly aligned with the die surfaces that will in turn produce the respective walls in the final part. When sealed and pressurized, the tube expands out into the dies, producing a final part with a rectangular, four walled cross section, in the embodiment disclosed. The wall thicknesses vary in accordance with the variant thickness of the original blank. In addition, the thickness blend areas in the original blank create smooth corner transitions between the walls.

DESCRIPTION OF THE PREFERRED EMBODIMENT

These and other features of the invention will appear from the following written description, and from the drawings, in which.

Figure 1:
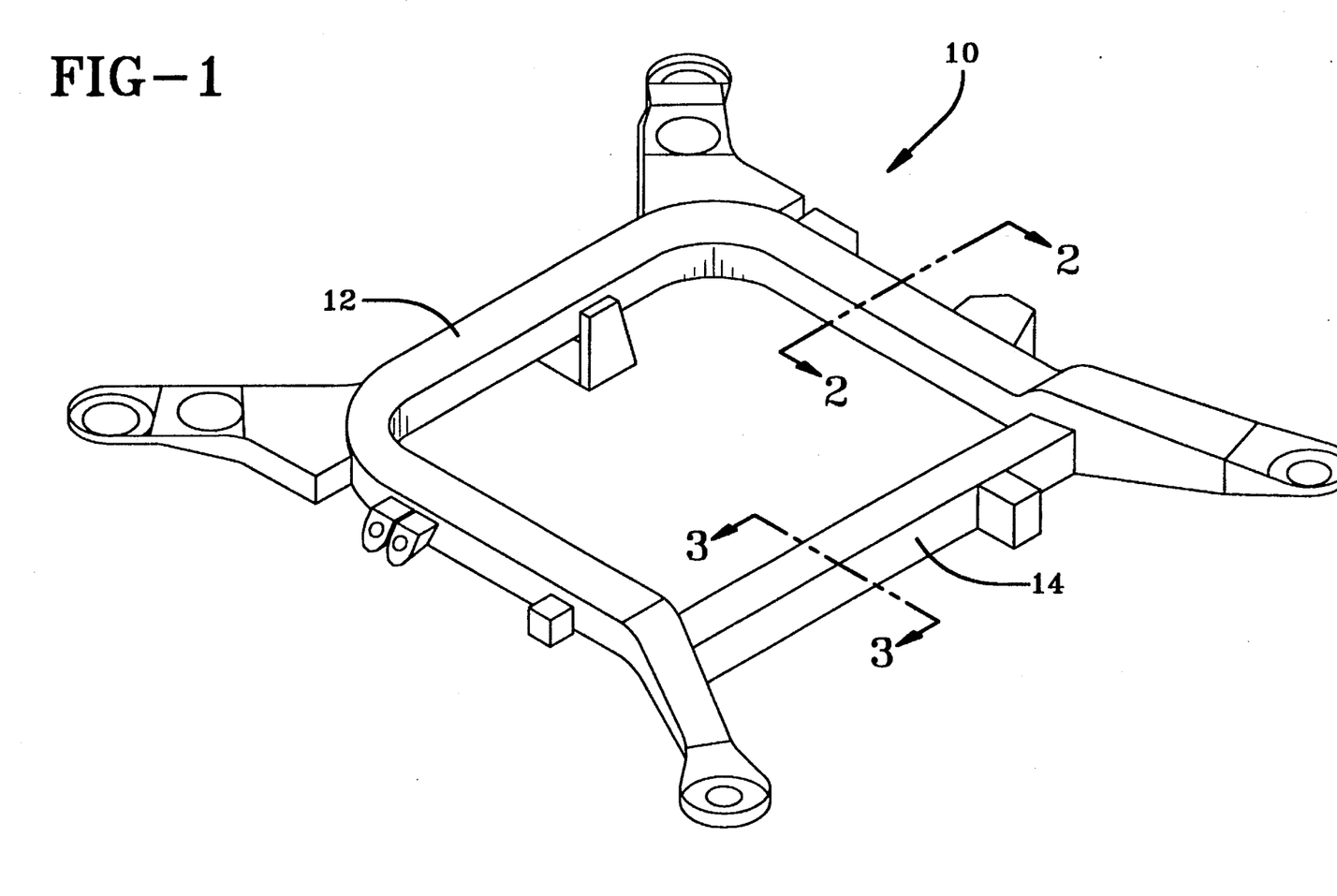
FIG. 1 is a perspective of a structural member made according to the method of the invention.
Figure 2:
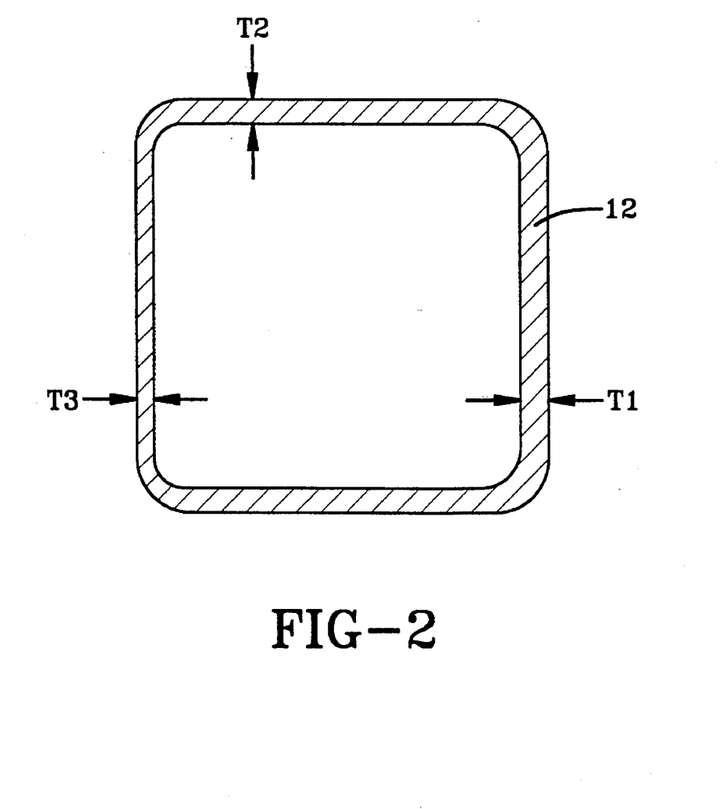
FIG. 2 is a cross section of one part of the structural member, taken in the plane indicated by the line 2—2 in FIG. 1.
Figure 3:
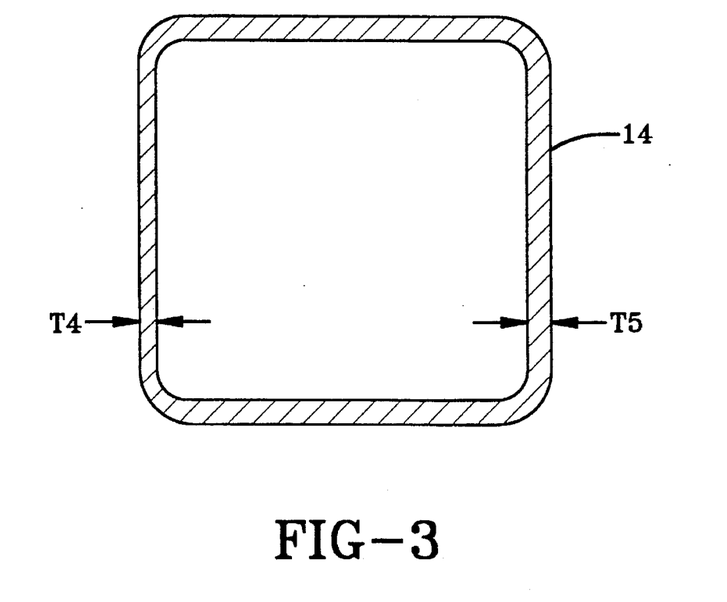
FIG. 3 is a cross section of a second part of the structural member, taken in the plane indicated by the line 3—3 in FIG. 1.

Referring first to FIGS. 1 through 3, a structural member made according to the invention, an engine cradle indicated generally at 10, is basically rectangular in shape, comprised of two parts, including a three sided, U-shaped frame 12 and a straight cross member 14. The two separate parts 12 and 14 of engine cradle 10 are necessary only because it is a four sided part that cannot be completely integrally formed. Both parts are also basically tubular and rectangular in cross section (a cross section being taken at any point along and perpendicular to the central axis of the tube), and the four walls of each vary in thickness. Thus, as shown in the FIG. 2 cross section of the frame 12, the right wall (which is the inner wall of frame 12) is thickest, with a thickness T1 of approximately 5.2 mm. The upper and lower walls have an intermediate thickness, T2, of approximately 4.2 mm, and the left wall (outer wall of frame 12) is thinnest, T3, at approximately 3.1 mm. As shown in the FIG. 3 cross section of cross member 14, the left wall (outer wall of cross member 14) is thinnest, T4, at approximately 3.1 mm, while the remaining walls have the same thickness, T5, of approximately 4.2 mm. However, at any point along the length of the various walls of either frame 12 or cross member 14, the wall thickness is substantially the same. The impetus for the varying wall thickness is a desire to lighten the engine cradle 10 by hydroforming it from aluminum, rather than steel. Steel tube blanks have a constant wall thickness, as will the finished part itself. However, to simply replicate the cradle 10 in aluminum would require thickening the wall cross section all the way round, and the weight savings would, in consequence, be less significant. A careful structural analysis shows that the outer wall of the frame 12 and the inner wall of the cross member 14 are those requiring the greatest thickness, while the others can be made thinner, if a way can be found to do that, and still retain an overall sufficient strength. However, conventional hydroforming methods can produce only constant wall thicknesses, at any given cross section. To produce walls in the final part of varying cross section by known methods would require fabricating a blank that was the lengthwise equivalent of the blank shown in U.S. Pat. No. 5,333,775. That is, four lengthwise pieces, each with the desired thickness, would have to be welded together along lengthwise seams. This is impractical in terms of cost and time.

Figure 4:
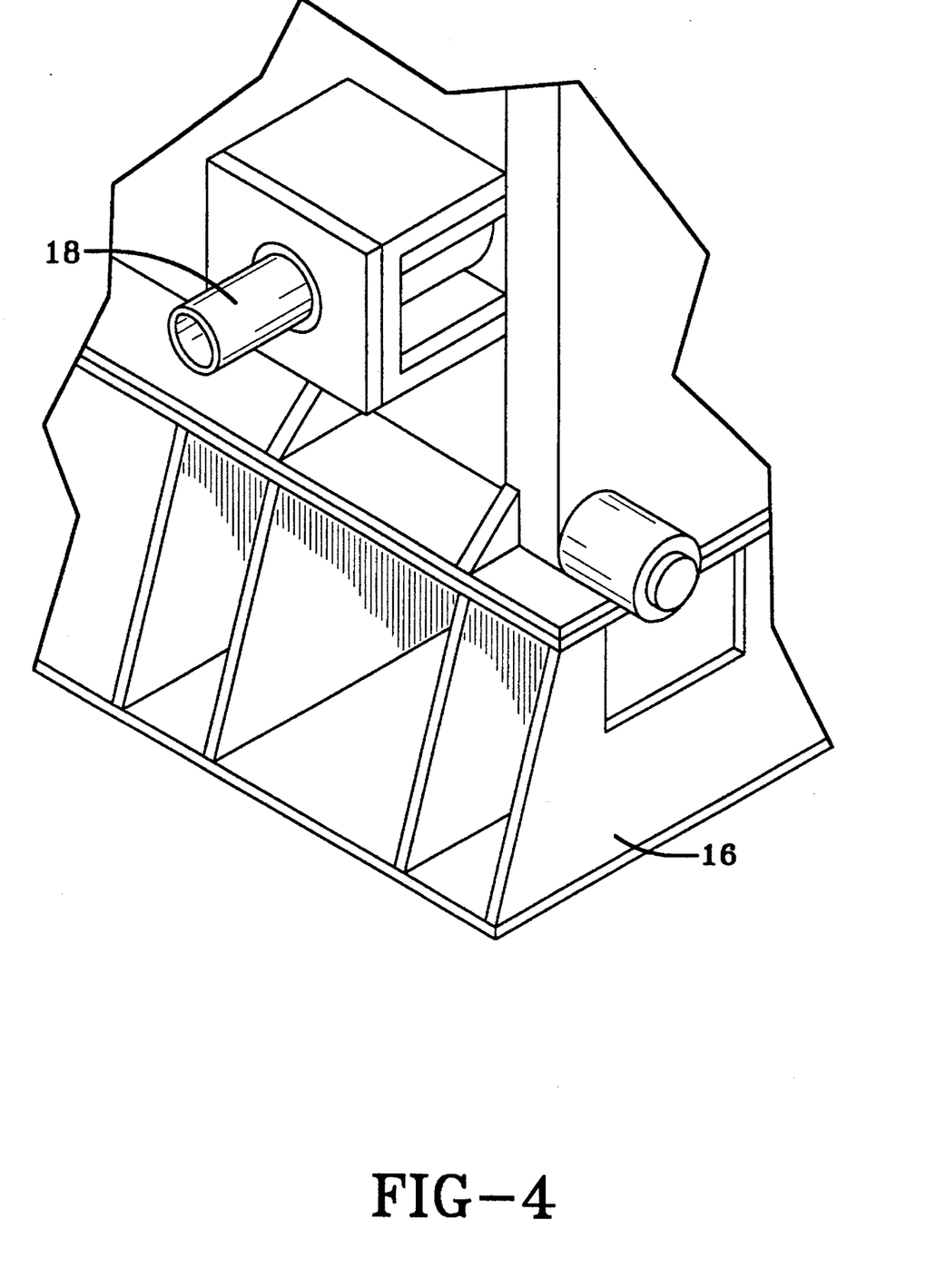
FIG. 4 is a perspective view of an extrusion producing a tube blank of the type used in the process.

Referring next to FIG. 4, the invention provides a multi-wall thickness structural member with essentially no extra process steps by first extruding a continuous aluminum tube blank that will itself create the varying wall thicknesses in the final part when it is hydroformed. A conventional press, indicated generally at 16, is shown forming a generic cylindrical tube, indicated at 18. Typically, tubes and other extruded parts have a symmetrical cross section. But they need not. The dies through which the heated, pressurized metal is forced can be cut so as to create asymmetrical shapes, and that is what is done in this case, as is described in detail next.

Figure 5:
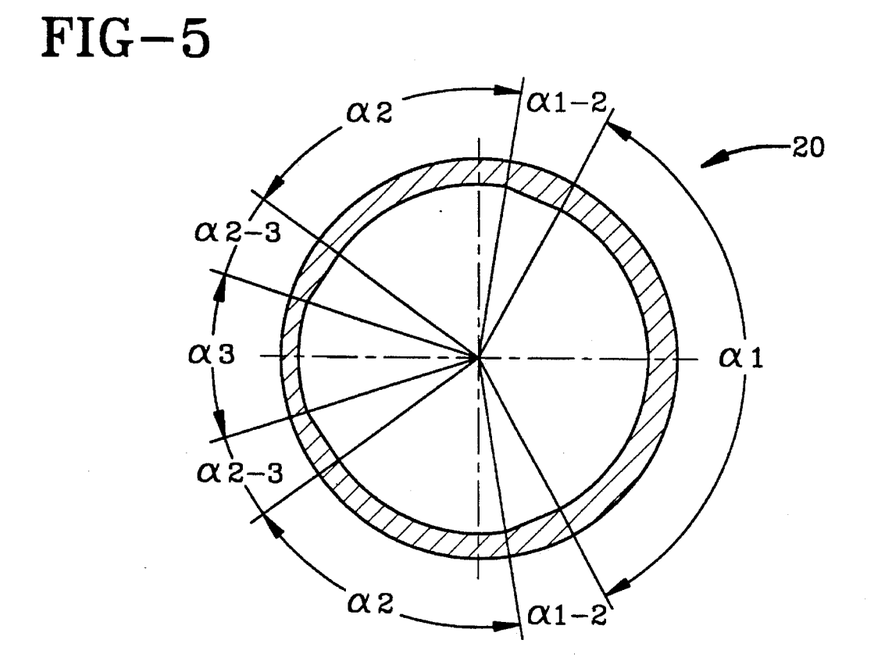
FIG. 5 is a cross section of the tube blank used to make the first part of the structural member.

Referring next to FIGS. 2 and 5, a first tube blank, indicated generally at 20, is first extruded, and later used to produce the frame 12. First blank 20 is simply cylindrical on its outer surface, with an outside diameter of approximately 70 mm in the embodiment disclosed. The inner surface, however, is not the typical concentric cylinder that would yield a constant radial wall thickness relative to the outer surface, as is the case with conventional steel tubes. Instead, blank 20 is extruded with an inner surface which, in general, creates a varying radial wall thickness, varying in the circumferential, but not the longitudinal, direction. More specifically, blank 20 has a first angular sector or portion, indicated at $\alpha 1$, which is basically pie-shaped, covering approximately 123 degrees. It has a wall thickness corresponding to the thickness T1 of the right wall (outer wall) of U-shaped frame 12, or approximately 5.2 mm. The angular portion $\alpha 1$ is shown as being centered on the dotted 3 o'clock line, which is an arbitrary reference line used to correspond it with its respective wall in the finished part, that is, to the outer wall of the U-shaped frame 12. When the 3 o'clock line of FIG. 5 bisects the outer wall of U-shaped frame 12 shown in FIG. 2, then the blank 20 and the cross section of U-shaped frame 12 are considered aligned. Continuing the pattern, blank 20 has two more angular portions, indicated at $\alpha 2$, which cover approximately 62.5 degrees each, and which have a radial wall thickness corresponding to the upper and lower walls of U-shaped frame 12, or approximately 4.2 mm. The two angular portions $\alpha 1$ and $\alpha 2$ do not change thickness abruptly at their mutual border, but instead blend gradually into one another across identical sloped transition areas $\alpha 1$–2, covering approximately 20 degrees each. Finally, a third angular portion indicated at $\alpha 3$ covers approximately 32 degrees, and has a thickness corresponding to the remaining, inner wall of U-shaped frame 12, or approximately 3.1 mm. Likewise, the angular portion $\alpha 3$ blends into the bordering angular portions $\alpha 2$ across a pair of sloped transition areas $\alpha 2$–3, each covering approximately 20 degrees.

Figure 6:
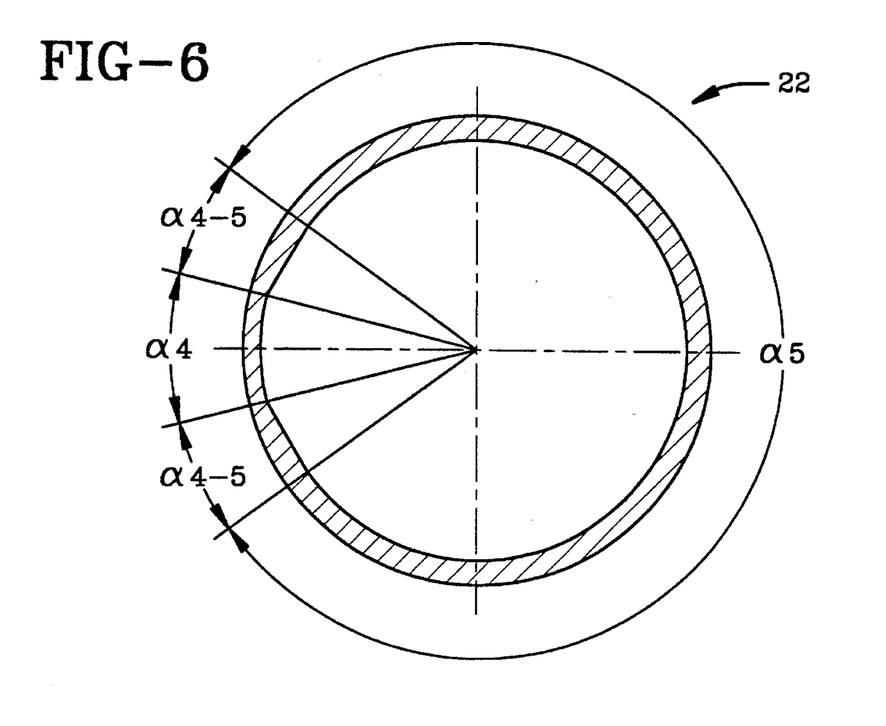
FIG. 6 is a cross section of the tube blank used to make the second part of the structural member.

Referring next to FIGS. 3 and 6, a second tube blank, indicated generally at 22, is extruded with which to produce the cross member 14. The second tube blank 22, in general, is like the first blank 20, produced in the same way and from the same material, and corresponds in the same fashion to the cross member 14. Specifically, second tube blank 22 is a cylindrical tube with an outer diameter of approximately 82.5 mm. It has an angular portion $\alpha 5$, centered on the three o'clock dotted line, which has a thickness of approximately 4.2 mm. When aligned with the cross member 14 the three o'clock line would bisect the right hand wall of the FIG. 3 cross section. The angular portion $\alpha 5$ is large, covering most of the cross section of blank 22 at approximately 288 degrees, because it corresponds to all but the left hand wall (outer wall) of cross member 14. The remainder of second tube blank 22 comprises an angular portion $\alpha 4$, corresponding to the left hand wall of cross member 14, with a thickness of approximately 3.1 mm and covering an angle of approximately 32 degrees. The two angular portions $\alpha 4$ and $\alpha 5$ merge into one another across sloped transition areas $\alpha 4$–5, each covering approximately 20 degrees.

Figure 7:
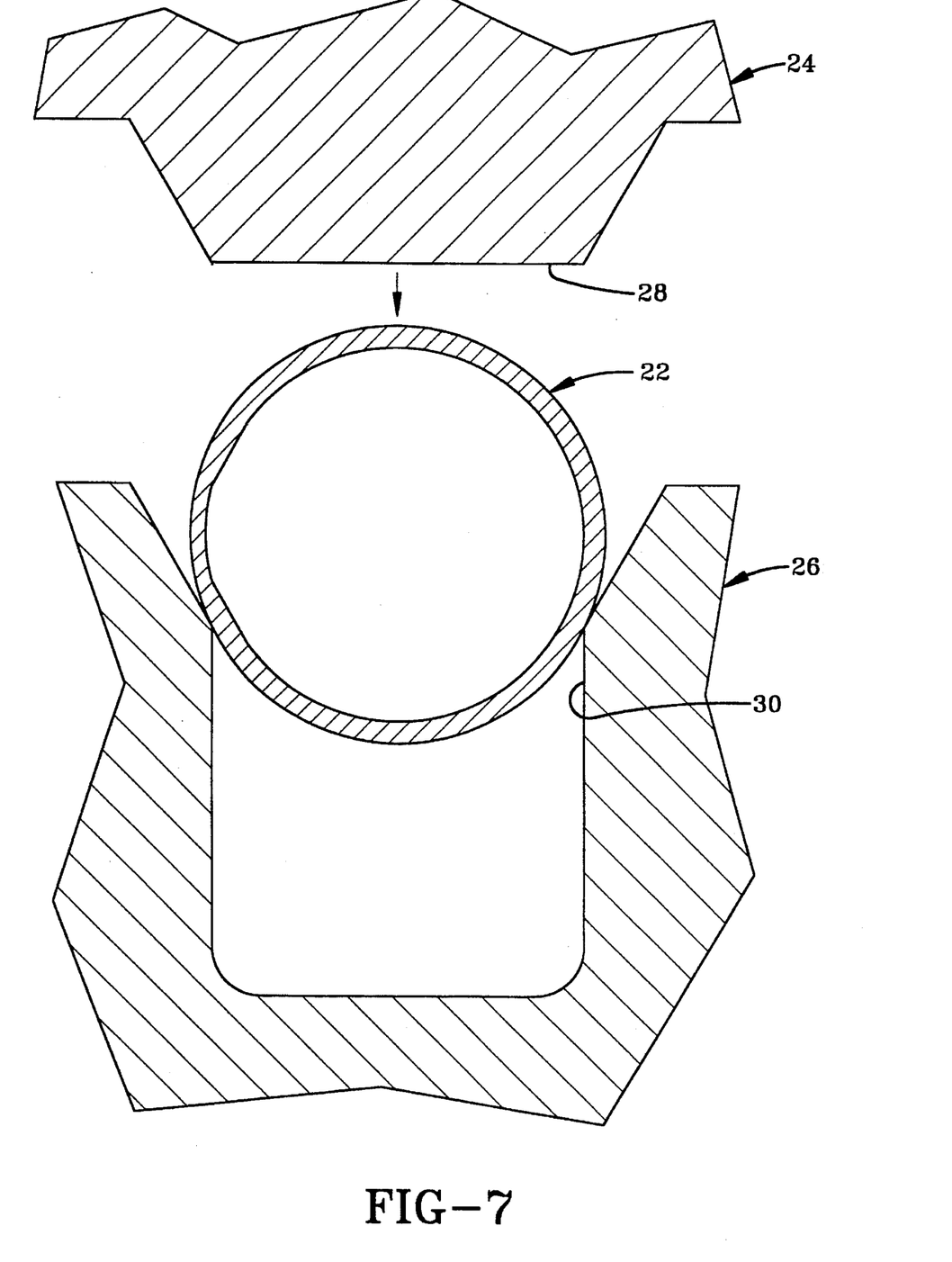
FIG. 7 is a cross section of the dies used to hydroform the second part of the structural member, shown before the dies have closed around the blank.
Figure 8:
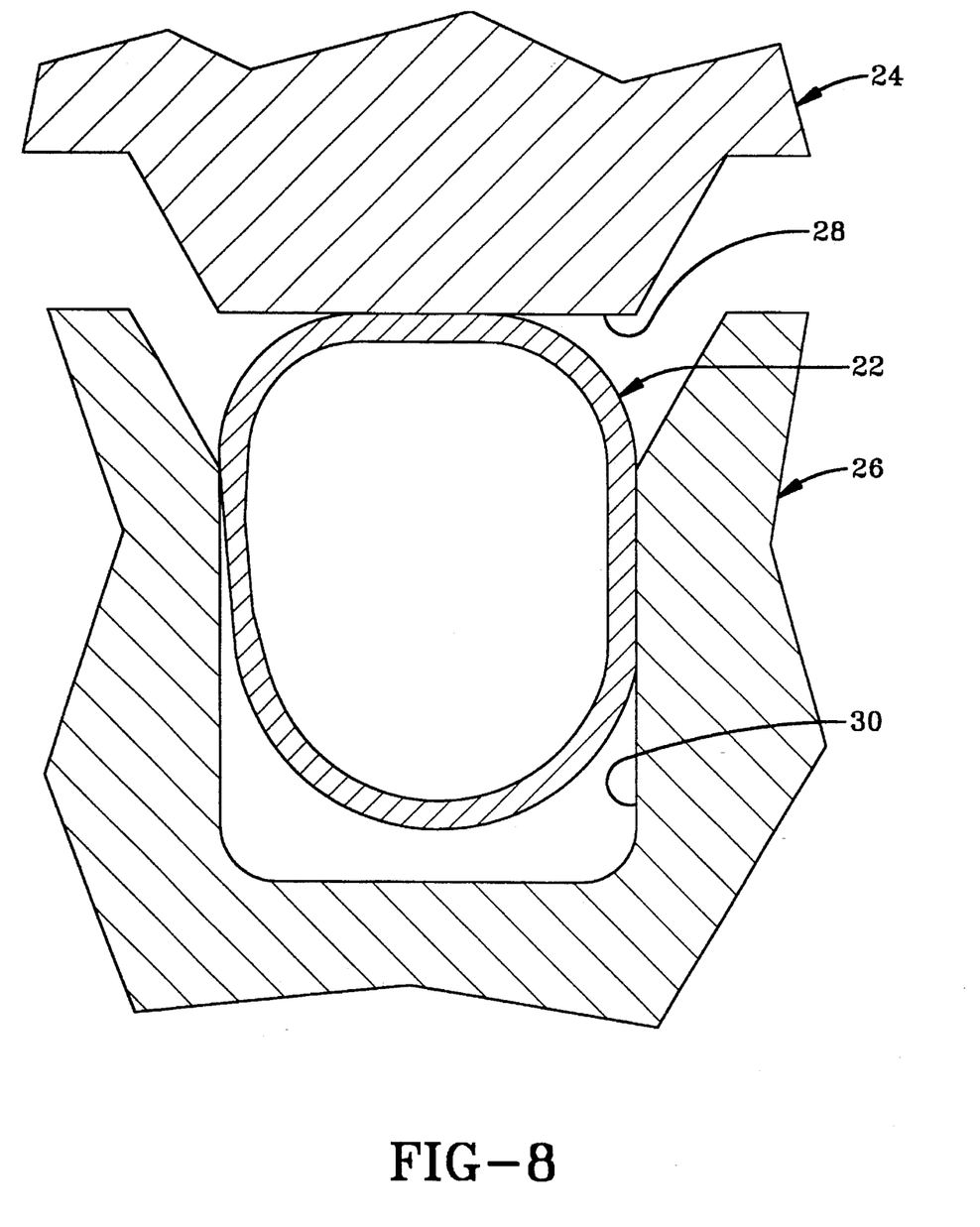
FIG. 8 is a view like FIG. 7, but showing the dies partially closed around the blank.
Figure 9:
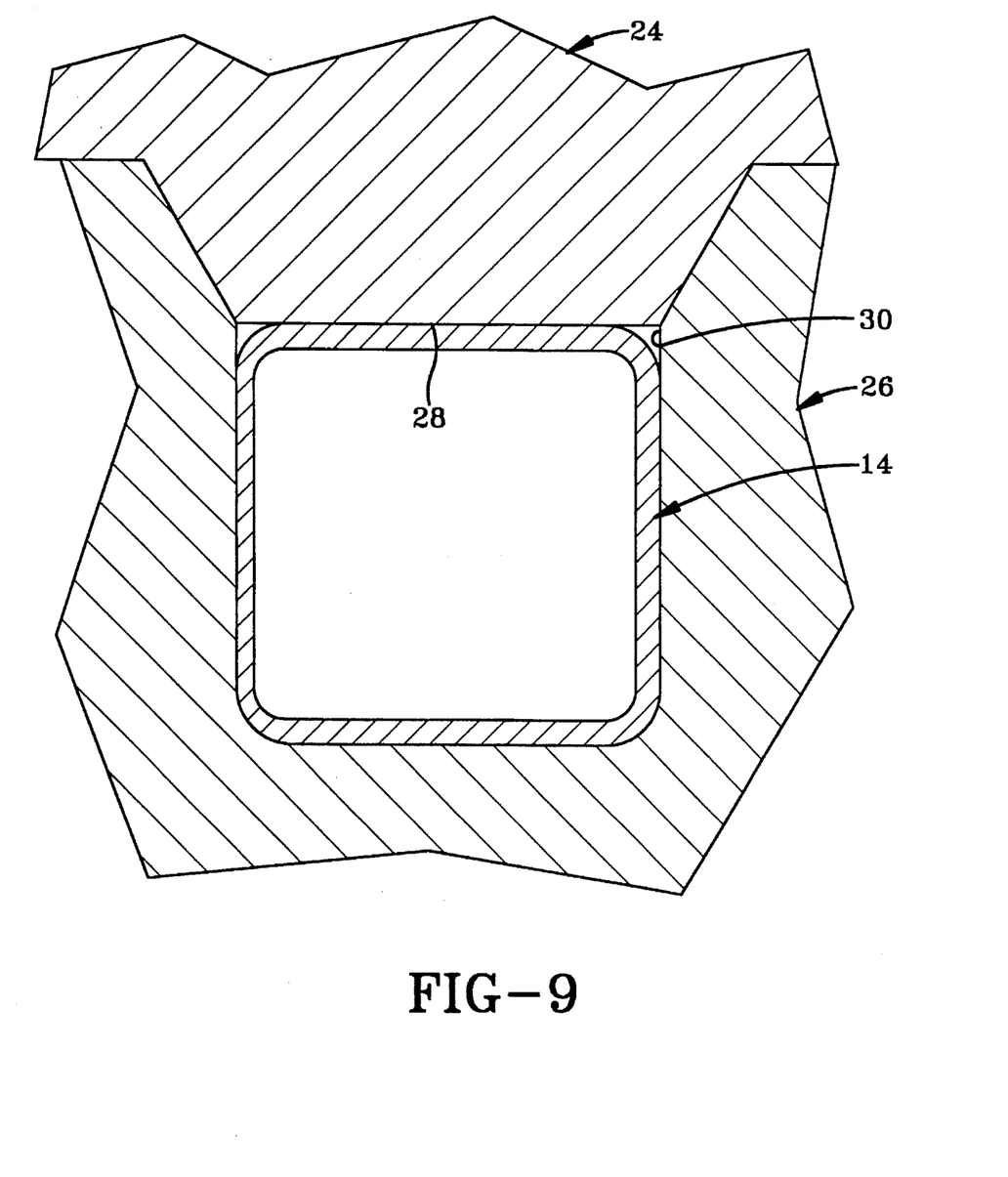
FIG. 9 is a view like FIG. 8, but showing the dies fully closed and the blank fully expanded to produce the finished cross section.

Referring to FIGS. 7 through 9, the hydroforming of the second blank 22 to produce the cross member 14 is illustrated in detail. A pair of hydroforming dies, an upper die indicated generally at 24, and a lower die 26, of conventional material and design, are used. Upper die 24 has a flattened protrusion 28 that fits down into matching trough 30 in lower die 26 to create a rectangular cross section interior cavity space, the surface of which matches the size and shape of the exterior of cross member 14. Because cross member 14 is basically straight, little or no pre-bending would be needed for second blank 22 before it was aligned with and between the dies 24 and 26, as is shown in FIG. 7. Again, by "aligned" it is meant that the blank 22 would be oriented with the center of the angular portion $\alpha 5$ lying on the center of the right hand surface of the trough 30, which is the surface that ultimately creates the right hand or inner wall of cross member 14. When so aligned, all of the various angular portions of blank 22 are aligned with the respective walls of the finished cross member 14 that they will eventually produce. Once aligned and held rigidly in place, the ends of blank 22 are plugged, it's interior prepressurized to a level sufficient to prevent buckling, and the dies 24 and 26 are closed down over it. This is shown occurring in FIG. 8, and the blank 22 is being partially deformed into the rectangular final shape. Finally, as shown in FIG. 9, the dies 24 and 26 fully close and the interior of blank 22 is brought up to a pressure sufficient to expand it out into the surfaces of both trough 30 and protrusion 28. At this point, the desired cross sectional shape of cross member 14, with the desired varying wall thicknesses, is complete. The main angular portions of the blank 22 provide the corresponding various wall thicknesses of the completed cross member 14, because of the way blank 22 is oriented between the dies 24 and 26. The transition areas, $\alpha 1$–2 and $\alpha 2$–3, stretch out as blank 22 is expanded under pressure and provide smooth corner transitions between the various wall thicknesses. Thus, for example, the total angle subtended by the angular portion $\alpha 4$ and the two bordering transition areas $\alpha 4$–5 of FIG. 6, approximately 72 degrees, is enough to create both the thinner left hand wall of cross member 14 and the two corners thereof that blend into the thicker upper and lower walls. The hydroforming process per se would be essentially transparent to the operator, as compared to the production of conventional, constant thickness tubular members. That is, the blank 22 has to be produced regardless, which is done before the hydroforming process. All that the operator would have to do differently would be to orient the blank 22 angularly between the dies as described, which is not an issue with constant thickness tubing.

While not separately described, the formation of the U-shaped frame 12 from the first blank 20 would be essentially the same. Since the U-shaped frame 12 is three sided, and not straight like cross member 14, the blank 20 would have to be pre-bent into a basic three sided shape, but this is standard hydroforming technique. However, the blank 20 would have to be properly oriented during the pre-bending step to align the various thickness portions thereof with the corresponding walls of the final part, which is not an issue when constant thickness tubing is bent. Once the pre-bending was completed, however, properly orienting the now U-shaped blank 20 between its dies would be simpler, since, unlike a straight tube, it would naturally settle into the dies' cavity at the proper angular orientation.

The design principles set out above could be used to produce a final part with any number of walls of any thickness, and of any cross sectional shape, although most hydroformed parts are polygonal in cross section, with extended, substantially flat walls, and usually rectangular, or nearly so, in cross section. The designer, in each particular case, would call for an extruded cylindrical blank with angular portions of a thickness corresponding to, and of a width sufficient to, produce the various walls desired in the final structural member. Each of the varying thickness angular portions in the blank should be separated by sloped transition areas of sufficient width to stretch out, under expansion pressure, and produce smooth corners between the flat walls in the final part. This technique could be combined with the methods used to produce structural members with thickness that do vary in the longitudinal direction, if desired. For example, since the outer surface of the tube blank is still a perfect cylinder, a sleeve could be inserted over it, as taught in U.S. Pat. No. 4,759,111, to create a locally reinforced area. In essence, since the tube blank is so similar to a conventional tube blank, most other hydroforming techniques could be practiced independently and in addition thereto. Therefore, it will be understood that it is not intended to limit the invention to just the embodiment disclosed.

We claim:

1. A method for hydroforming a generally tubular structural member in which the wall thickness of a cross section of said member taken at any point is circumferentially variant but longitudinally constant, comprising the steps of, extruding a generally cylindrical tubular blank in which the wall thickness of a cross section taken at any point substantially corresponds to the wall thickness desired in said structural member, placing said blank between a pair of hydroforming dies forming an interior space that matches the desired exterior cross sectional shape of said structural member and with said blank oriented relative to said dies such that its wall thickness corresponds to the wall thickness desired in said structural member, and, pressurizing the interior of said blank so as to force it out into the interior space of said dies.

2. A method for hydroforming a generally tubular structural member having a polygonal cross section with extended, substantially flat walls of varying thickness, comprising the steps of, extruding a generally cylindrical tubular blank the cross section of which has angular portions of a thickness corresponding and width corresponding to said varying thickness walls, placing said blank between a pair of hydroforming dies forming an interior space that matches the polygonal cross section of said structural member and with said blank oriented relative to said dies such that its varying thickness angular portions are aligned with the respective walls of said structural member, and, pressurizing the interior of said blank so as to force it out into the interior space of said dies.

* * * * *